Nov. 16, 1954  W. W. MASENGILL  2,694,482
STOCK FEEDING DEVICE
Filed July 26, 1949  2 Sheets-Sheet 1
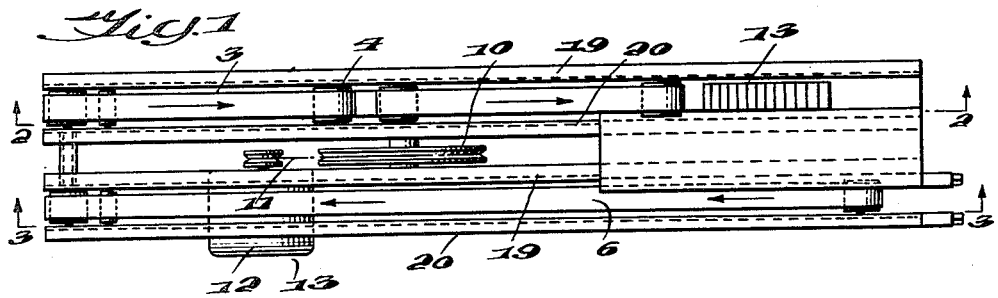
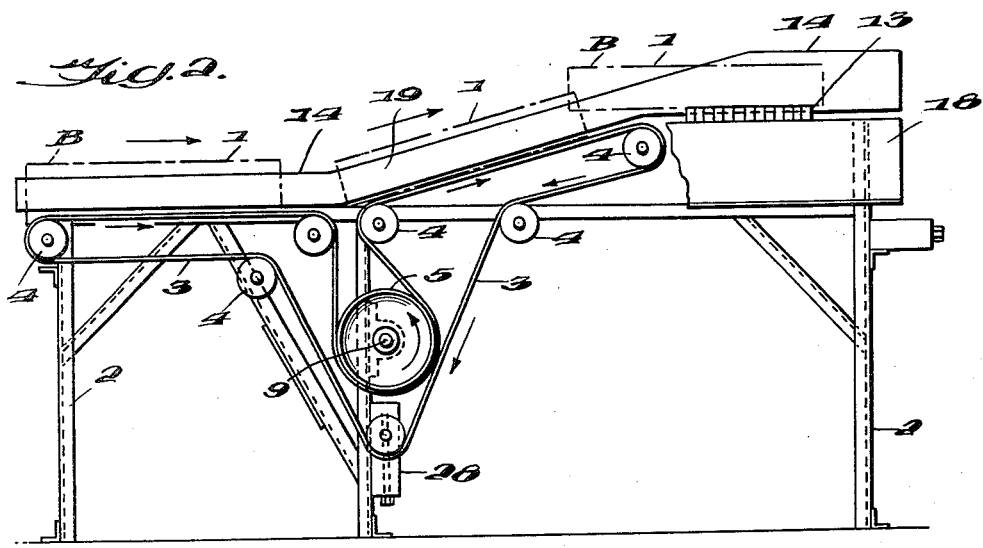
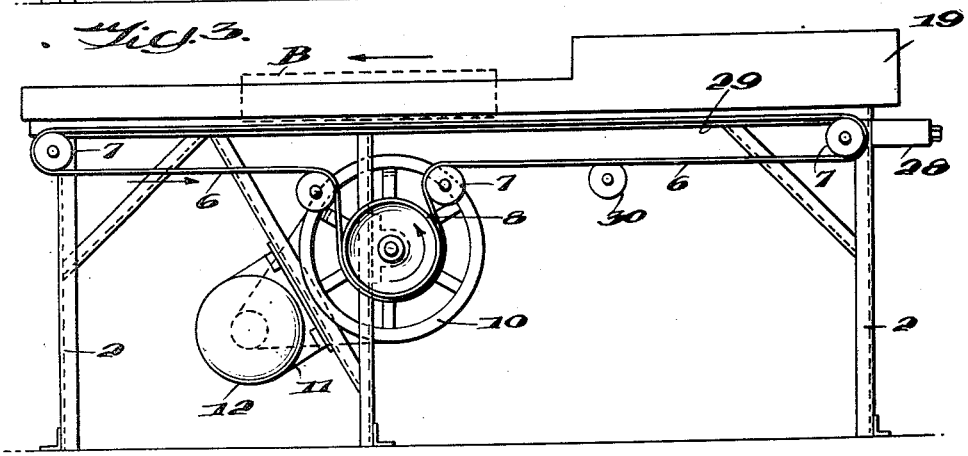
INVENTOR.
WILLIAM W. MASENGILL,
BY

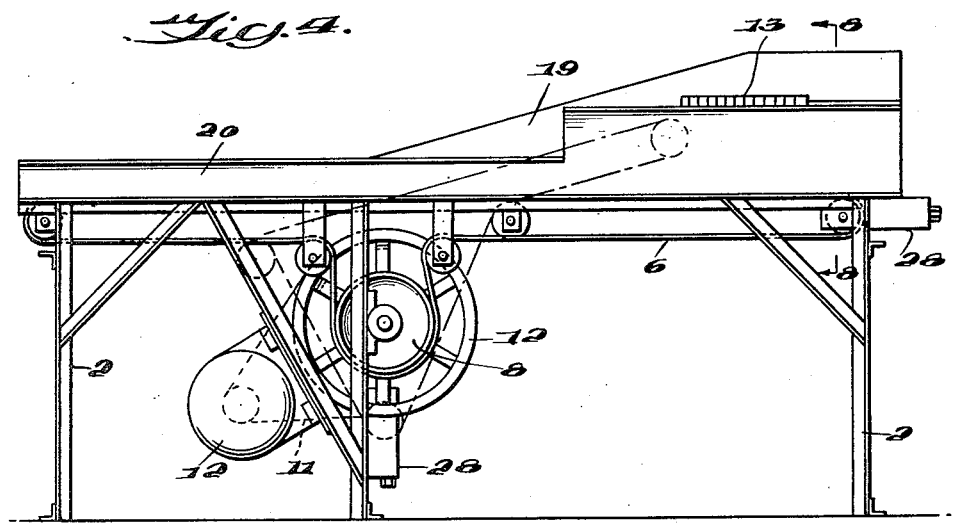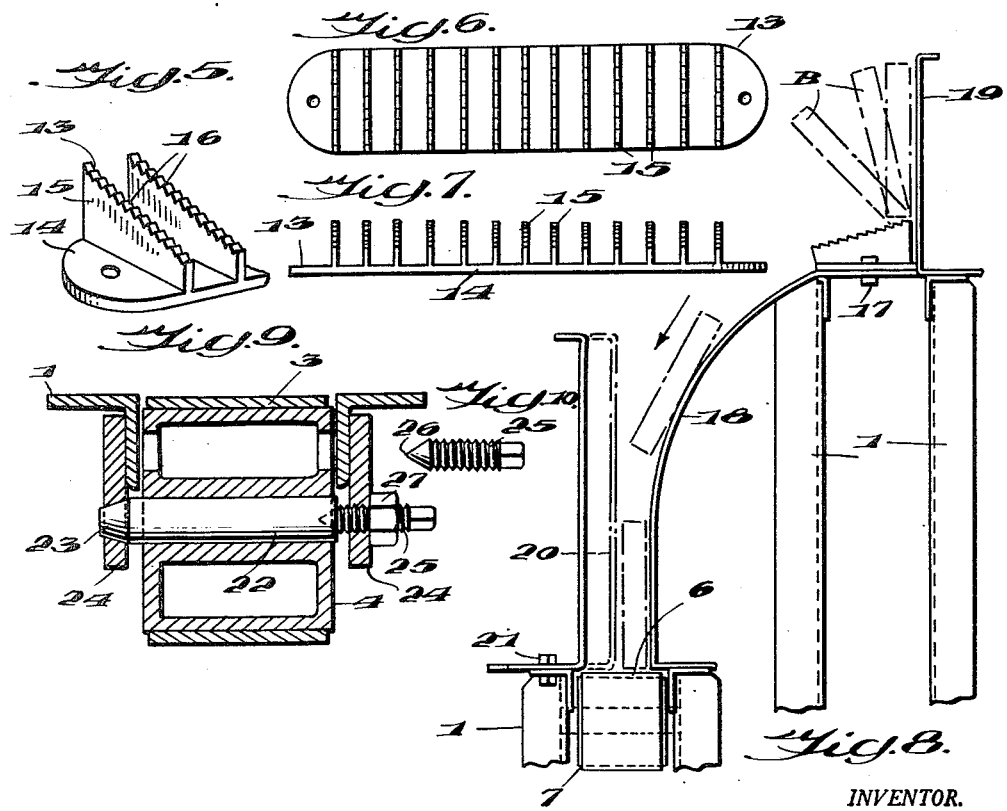

United States Patent Office 2,694,482
Patented Nov. 16, 1954

2,694,482

STOCK FEEDING DEVICE

William W. Masengill, Morristown, Tenn., assignor to Walters Mfg. Company, Morristown, Tenn., a corporation of Tennessee Application July 26, 1949, Serial No. 106,905

18 Claims. (Cl. 198—33)

This invention relates to improvements in stock feeding means, particularly for feeding boards to edgers and joiners and for turning over the boards and returning them for operation on the respective opposite edges thereof.

In the finishing of boards, especially for furniture factories and for other purposes, it is usually desirable that the opposite edges thereof be smooth and finished, which necessitates the movement of the boards through the machine for separate operation on the respective edges, especially where the machines are not equipped to act simultaneously on both edges, as is true in many edgers and joiners. Feeding devices proposed heretofore have not been satisfactory for returning the boards for action thereon at the respective edges.

The object of this invention is to simplify and improve feeding devices for this purpose which will insure of the turning over of the boards at the end of one feeding action to return the board to its initial position in reversed relation and thereby assure that it will be in condition for operation on its opposite edge.

This object may be accomplished by the construction of a device including a pair of feeding conveyors arranged side by side, one of which is adapted to feed the boards in one direction with means located at the end of the feeding run thereof, not only to transfer the boards onto the second conveyor but also to insure of turning edge for edge of the respective boards, so the return movement thereof will permit of operation on the opposite edge of each board. The turning means may involve a unit which will engage the board at its edges and prevent accidental sliding thereof so as to cause the board to be reversed in position as it is turned over from one conveyor to the other. Notched blades, or plates, have been found satisfactory for this purpose.

One embodiment of the invention is illustrated in the accompanying drawings in which:

Fig. 1 is a top plan view of the conveying and turning device according to this invention;

Fig. 2 is a longitudinal section thereof on the line 2—2 in Fig. 1;

Fig. 3 is a similar view on the line 3—3 in Fig. 1;

Fig. 4 is a side elevation of the device;

Fig. 5 is a perspective view of a portion of the turning device;

Fig. 6 is a top plan view thereof;

Fig. 7 is a side elevation thereof;

Fig. 8 is an enlarged cross section through the conveying and turning device on the line 8—8 in Fig. 4;

Fig. 9 is a detail cross section through one of the guide pulleys; and

Fig. 10 is a side elevation of a mounting screw therefor.

The conveying and turning device illustrated as one embodiment of this invention is shown as comprising a supporting frame, parts of which are illustrated generally by the numeral 1 and carried by supporting legs 2. These parts may be formed of angle bars or other sufficiently rigid material to mount the operating parts of the machine.

Supported by the frame 1—2 is an advancing conveyor generally designated at 3, shown in the form of an endless conveyor or belt extending over guide pulleys 4 and having a reentrant portion in the upper run thereof that extends around a driving pulley 5, as shown in Fig. 2.

Extending parallel with the conveyor 3 and spaced laterally therefrom, as shown in Fig. 1, is a second conveyor 6 also shown in the form of an endless belt device guided by pulleys 7 and having the lower run thereof extending around a driving pulley 8.

The endless belts 3 and 6 extend lengthwise of the frame substantially in parallel relation in the form illustrated and are adapted to convey a board B along the device, as illustrated in several positions in Figs. 2 and 3, moving the board first in one direction between the ends of the feeding and turning device and then in the opposite direction. Consequently, the upper runs of the respective conveyors should be driven in opposite directions which will be accomplished by the belt arrangements shown in Figs. 2 and 3, and yet the driving pulleys 5 and 8 are both mounted on the same drive shaft 9 extending transversely of the frame and journaled in bearings thereon. The shaft 9 has a driving pulley 10 fixed thereto and connected by a driving belt 11, with the armature shaft of a driving motor 12, or with other suitable driving means for the device.

At the discharge end of the upper run of the conveyor 3 is a turning device generally indicated at 13 and shown more in detail in Figs. 5–8. This turning device is adapted to receive the boards B from the conveyor 3 and to insure of turning movement thereof as the boards are directed onto the return conveyor 6.

In the form illustrated, this turning device 13 comprises a bed plate 14 having a plurality of upstanding longitudinally spaced ribs or blades 15 secured thereto as by welding or in other suitable manner. The upper edges of the ribs or blades 15 are serrated, as indicated at 16, and also are downwardly inclined in oblique positions as will be apparent from the drawings. It has been found that saw blades may be used satisfactorily for these ribs or blades 15 and cut to the desired shapes. The base 14 may be secured by detachable fastenings 17 to the frame 2 of the machine, as shown in Fig. 8.

The turning device 13 is mounted at the discharge end of the conveyor 3 to receive the board directly therefrom, the board being forced lengthwise of the turning device 13 by the feeding movement of the conveyor. As the board reaches the discharge end of the conveyor, it will fall over laterally as its lower edge rests upon the serrated upper edges 16 of the blades or ribs 15, which will cause it to turn or swing laterally in the relations illustrated in Fig. 8, being directed down over an inclined or curved guide 18 onto the upper run of the return conveyor 6. Thus, the board will be reversed edge for edge as it is returned by the conveyor 6 in position for action on the opposite edge thereof by the wood-working machine such as a joiner or edger.

The boards are guided along the conveyors 3 and 6 by upright guides generally indicated at 19 and 20, located respectively at the opposite edges of each conveyor. These upright guides 19 and 20 will allow the boards to ride on the upper runs of the conveyors in upstanding relation therebetween and guide them edgewise through the machine. The guides 19 are shown as rigidly fixed to the frame 2 of the machine, while the guides 20 may be adjustably mounted thereon by slot and bolt adjustments generally indicated at 21 to permit of lateral shifting of the guides 20 to accommodate for differences in thicknesses of the boards.

Each of the pulleys 4 and 7 that carry and guide the belts 3 and 6 preferably is adjustably mounted in the frame in the manner illustrated in Fig. 9. The guide pulley is mounted on a spindle 22, one end of which is cone-shaped at 23 and is mounted in a plate 24 secured to the frame 1. The opposite end of the spindle 22 is held in place by a set screw 25 having an eccentric pointed end 26 which engages in a recess in the adjacent end of the spindle 22. The set screw 25 is threaded through a companion plate 24 and may be locked in place by a jam nut 27. Thus, by turning the set screw 25, the eccentric point 26 thereof will shift the point of support of the adjacent end of the spindle 22 and thereby tilt in one direction or the other the axis of the pulley 4 or 7, thereby insuring of proper tracking of the belt guided thereon.

Several of the guide pulleys are shown as provided with belt tightening devices generally designated at 28, which may be of any suitable or conventional construction well known in the art and are not illustrated in detail. These will serve to apply the proper tension to the belt at all times.

The upper run of each belt may be provided with a plate of wood or metal, as indicated at 29, to provide support for the board especially at the receiving point. When necesssary, pulleys 30 are provided for the lower run of each belt, as illustrated in Fig. 3.

The operation of the device will be apparent from the foregoing description as seems to be evident, whereby boards are fed lengthwise along the conveyors from one end of the machine to the other, and are turned over automatically before the return movement by the second conveyor. This is accomplished automatically without requiring hand manipulation of the boards intermediate the respective feeding actions. The drive of the belts is extremely simple being accomplished by a single drive shaft with a source of power which operates to move the belts in opposite directions of feeding movement and yet the speed of operation of the belts is reduced to the extent required.

While the invention has been illustrated and described in one embodiment, it is recognized that variations and changes may be made therein without departing from the invention, except as specified in the claims.

I claim:

1. A stock feeding device comprising conveyors arranged in side-by-side relation adapted to receive boards thereon for movement lengthwise of the device, means for operating said conveyors in opposite directions of feeding movements, and means for directing the boards from one of the conveyors onto the other conveyor automatically at a point in the movement thereof spaced from and beyond the discharge end of said one of said conveyors and for automatically turning over the boards during said directing movement, said turning means comprising a stationary rest at one end of the first-mentioned conveyor, said rest having a surface inclined laterally of the conveyor for engagement with a side edge of each of said boards, and a guideway extending downwardly from said inclined surface toward said second conveyor.

2. A stock feeding device comprising conveyors arranged in side-by-side relation adapted to receive boards thereon for movement lengthwise of the device, means for operating said conveyors in opposite directions of feeding movements, and a stationary turning device having a surface inclined laterally of the conveyor for engagement with a side edge of each of said boards, said device being positioned at the discharge end of one conveyor and having a downwardly extending guideway inclined at an acute angle to said surface, said guideway extending toward said conveyor and being in a position for automatically reversing the board in directing said board onto the second conveyor.

3. A stock feeding device comprising conveyors arranged in side-by-side relation adapted to receive boards thereon for movement lengthwise of the device, means for operating said conveyors in opposite directions of feeding movements, and a turning device at the discharge end of one conveyor in position for automatically reversing the board in directing said board onto the second conveyor, said turning device comprising a plurality of upright ribs having downwardly inclined upper edges in position to receive an edge of each board and to cause turning over of the board thereon.

4. A stock feeding device comprising conveyors arranged in side-by-side relation adapted to receive boards thereon for movement lengthwise of the device, means for operating said conveyors in opposite directions of feeding movements, a turning device at the discharge end of one conveyor in position for automatically reversing the board in directing said board onto the second conveyor, said turning device comprising a plurality of upright ribs having downwardly inclined upper edges in position to receive an edge of each board and to cause turning over of the board thereon, and additional means for directing the board in turned-over position from said turning device onto the second conveyor.

5. A stock feeding device comprising conveyors arranged in side-by-side relation adapted to receive boards thereon for movement lengthwise of the device, means for operating said conveyors in opposite directions of feeding movements, and a turning device at the discharge end of one conveyor in position for automatically reversing the board in directing said board onto the second conveyor, said turning device comprising a plurality of upright ribs having serrated upper edges in positions for receiving an edge of each board thereon from the first-mentioned conveyor to cause a reversing of the board in turning over onto the second conveyor.

6. A stock feeding device comprising conveyors arranged in side-by-side relation adapted to receive boards thereon for movement lengthwise of the device, means for operating said conveyors in opposite directions of feeding movements, a turning device at the discharge end of one conveyor in position for automatically reversing the board in directing said board onto the second conveyor, said turning device comprising a plurality of upright ribs having serrated upper edges in positions for receiving an edge of each board thereon from the first-mentioned conveyor to cause a reversing of the board in turning over onto the second conveyor, each of said serrated edges of the ribs being directed downwardly in inclined position toward the second conveyor, and additional means for directing the board from the turning device onto the second conveyor.

7. A stock feeding device comprising conveyors arranged in side-by-side relation adapted to receive boards thereon for movement lengthwise of the device, means for operating said conveyors in opposite directions of feeding movements, and a turning device at the discharge end of one conveyor in position for automatically reversing the board in directing said board onto the second conveyor, said turning device comprising a bed plate, a plurality of upright ribs mounted on the bed plate and each having a serrated upper edge downwardly inclined toward the second conveyor and disposed in the path of the boards discharged from the first conveyor in position to receive the edges thereof and to hold the edges for turning over of the boards by gravity onto the second conveyor, and separate means in position to direct the boards from the turning device onto the second conveyor.

8. A stock feeding device comprising a pair of endless conveyors extending in side-by-side relation adapted to receive boards thereon in upstanding positions, a turning device at the discharge end of one of the conveyors in position to receive the boards therefrom and to turn them over onto the other conveyor, said turning device comprising a plurality of upright ribs having serrated upper edges downwardly inclined toward the other conveyor, a guide plate extending between the conveyors in position to direct the boards from the first conveyor onto the other conveyor, and upright guides mounted beside the respective conveyors for holding the boards in upstanding edgewise relation thereon.

9. A stock feeding device comprising a pair of endless conveyors extending in side-by-side relation adapted to receive boards thereon in upstanding positions, a turning device at the discharge end of one of the conveyors in position to receive the boards therefrom and to turn them over onto the other conveyor, said turning device comprising a plurality of upright ribs having serrated upper edges downwardly inclined toward the other conveyor, a guide plate extending between the conveyors in position to direct the boards from the first conveyor onto the other conveyor, upright guides mounted beside the respective conveyors for holding the boards in upstanding edgewise relation thereon, a supporting frame for the conveyors, means rigidly fixing one of the guides beside each of the conveyors, and means for securing the other of the guides in adjusted positions beside each of the conveyors.

10. A stock feeding device comprising a pair of endless conveyors extending in side-by-side relation adapted to receive boards thereon in upstanding positions, a turning device at the discharge end of one of the conveyors in position to receive the boards therefrom and to turn them over onto the other conveyor, said turning device comprising a plurality of upright ribs having serrated upper edges downwardly inclined toward the other conveyor, a guide plate extending between the conveyors in position to direct the boards from the first conveyor onto the other conveyor, upright guides mounted beside the respective conveyors for holding the boards in upstanding edgewise relation thereon, a drive shaft, pulleys mounted on the drive shaft in side-by-side relation, one of the conveyors having the upper run thereof extending around one of the pulleys and the other conveyor having the lower run thereof extending around another of the pulleys in positions for operation of the conveyors in opposite directions upon rotation of the drive shaft, a supporting frame for the conveyors, and guide pulleys mounted on the frame for guiding the movement of the conveyors.

11. A stock feeding device comprising a pair of endless conveyors extending in side-by-side relation adapted to receive boards thereon in upstanding positions, a turning device having a surface at the discharge end of one of the conveyors in position to receive the boards therefrom and to turn them over onto the other conveyor, said surface having a width less than the width of said stock, a guide plate extending between the conveyors in position to direct the boards from the first conveyor onto the other conveyor, and upright guides mounted beside the respective conveyors for holding the boards in upstanding edgewise relation thereon.

12. A stock feeding device comprising a pair of endless conveyors extending in side-by-side relation adapted to receive boards thereon in upstanding positions, a turning device having a surface at the discharge end of one of the conveyors in position to receive the boards therefrom and to turn them over onto the other conveyor, said surface having a width less than the width of said stock, a guide plate extending between the conveyors in position to direct the boards from the first conveyor onto the other conveyor, upright guides mounted beside the respective conveyors for holding the boards in upstanding edgewise relation thereon, a supporting frame for the conveyors, means rigidly fixing one of the guides beside each of the conveyors, and means for securing the other of the guides in adjusted positions beside each of the conveyors.

13. A stock feeding device comprising a pair of endless conveyors extending in side-by-side relation adapted to receive boards thereon in upstanding positions, a turning device having a surface at the discharge end of one of the conveyors in position to receive the boards therefrom and to turn them over onto the other conveyor, said surface having a width less than the width of said stock, a guide plate extending between the conveyors in position to direct the boards from the first conveyor onto the other conveyor, upright guides mounted beside the respective conveyors for holding the boards in upstanding edgewise relation thereon, a drive shaft, pulleys mounted on the drive shaft in side-by-side relation, one of the conveyors having the upper run thereof extending around one of the pulleys and the other conveyor having the lower run thereof extending around another of the pulleys in positions for operation of the conveyors in opposite directions upon rotation of the drive shaft, a supporting frame for the conveyors, and guide pulleys mounted on the frame for guiding the movement of the conveyors.

14. A stock conveyor comprising a frame, means for receiving, turning over, and guiding stock discharged from said conveyor to a position disposed below said conveyor, said means being secured to said frame and spaced from the discharge end of said conveyor in the direction of its longitudinal axis, said means comprising a plurality of spaced ribs having a stock receiving surface formed thereon, and each of said ribs having an edge thereof inclined downwardly from said surface.

15. A stock conveyor comprising a frame, means for receiving, turning over, and guiding stock discharged from said conveyor to a position disposed below said conveyor, said means being secured to said frame and spaced from the discharge end of said conveyor in the direction of its longitudinal axis, said means including a plurality of longitudinally spaced polygonal members, having their respective sides in alignment one with another.

16. A stock feeding device comprising conveyors arranged in side-by-side relation adapted to receive stock thereon for movement lengthwise of the device, means for operating said conveyors in opposite directions of feeding movements, and means positioned in the lengthwise path of movement of said stock for directing the stock from one of the conveyors onto the other conveyor automatically at a point in the movement thereof and for automatically turning over said stock during said directing movement, said directing and turning means comprising a stationary rest having a first portion thereof adapted for engagement by an under edge of said stock, and a second portion inclined downwardly from said first portion toward said second conveyor.

17. A stock feeding device comprising conveyors arranged in a side-by-side relation adapted to receive stock thereon for movement lengthwise of the device, means for operating said conveyors in opposite directions of feeding movements, and means positioned in the lengthwise path of movement of said stock for directing the stock from one of the conveyors on to the other conveyor automatically at a point in the movement thereof, and for automatically turning over said stock during said directing movement, said directing and turning means comprising a stationary rest having a portion thereof adapted for engagement with an under edge of said stock, said first portion having a width less than the width of said under edge, and a second portion inclined downwardly from said first portion toward said second conveyor.

18. A stock feeding device comprising conveyors arranged in side-by-side relation adapted to receive stock thereon for movement lengthwise of the device, means for operating said conveyors in opposite directions of feeding movements, and means positioned in the lengthwise path of movement of said stock for directing the stock from one of the conveyors onto the other conveyor automatically at a point in the movement thereof and for automatically turning over said stock during said directing movement, said directing and turning means comprising a stationary rest having a first portion thereof adapted for engagement by an under edge of said stock, said portion having a width less than one half the width of said stock, and a second portion inclined downwardly from said first portion toward said second conveyor.

References Cited in the file of this patent

UNITED STATES PATENTS

| Number | Name | Date |
| --- | --- | --- |
| 421,385 | Chambers | Feb. 18, 1890 |
| 762,940 | Poignant | June 21, 1904 |
| 996,386 | Williams | June 27, 1911 |
| 1,156,385 | Willson | Oct. 12, 1915 |
| 1,826,379 | Birkmeyer | Oct. 6, 1931 |
| 1,872,402 | Candee | Aug. 16, 1932 |
| 1,966,268 | Steffen | July 10, 1934 |
| 2,344,461 | Hermani | Mar. 14, 1944 |
| 2,451,394 | Klein | Oct. 12, 1948 |
| 2,461,290 | Maynard | Feb. 8, 1949 |
| 2,511,194 | Blaber | June 13, 1950 |